United States Patent
Yokoi et al.

(10) Patent No.: US 11,920,578 B2
(45) Date of Patent: Mar. 5, 2024

(54) VALVE AND FLUID CONTROL DEVICE INCLUDING VALVE

(71) Applicant: Murata Manufacturing Co., Ltd., Kyoto (JP)

(72) Inventors: Hiroyuki Yokoi, Kyoto (JP); Nobuhira Tanaka, Kyoto (JP); Daisuke Kondo, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 782 days.

(21) Appl. No.: 17/029,612

(22) Filed: Sep. 23, 2020

(65) Prior Publication Data

US 2021/0003226 A1 Jan. 7, 2021

Related U.S. Application Data

(63) Continuation of application No. PCT/JP2019/010839, filed on Mar. 15, 2019.

(30) Foreign Application Priority Data

Apr. 24, 2018 (JP) .................................. 2018-083287

(51) Int. Cl.
*F16K 15/14* (2006.01)
*F04B 43/02* (2006.01)
(Continued)

(52) U.S. Cl.
CPC ............ *F04B 43/02* (2013.01); *F04B 43/046* (2013.01); *F04B 45/047* (2013.01); *F16K 15/02* (2013.01);
(Continued)

(58) Field of Classification Search
CPC ...... F16K 15/02; F16K 15/141; F16K 15/144; F16K 15/145; F16K 31/02;
(Continued)

(56) References Cited

U.S. PATENT DOCUMENTS 5,876,187 A * 3/1999 Forster ................ F16K 99/0021
417/322
2004/0075073 A1 * 4/2004 Claydon ............. B81C 1/00492
251/129.01
(Continued)

FOREIGN PATENT DOCUMENTS

DE 102008042054 A1 * 3/2010 ............ F04B 19/006
DE 102008056751 A1 * 5/2010 ............ F04B 43/021
(Continued)

OTHER PUBLICATIONS

International Search Report for International Application No. PCT/JP2019/010839 dated Jun. 18, 2019.
(Continued)

*Primary Examiner* — Marina A Tietjen
(74) *Attorney, Agent, or Firm* — Pearne & Gordon LLP

(57) ABSTRACT

A valve includes a first plate having a first vent hole; a second plate defining a valve chamber, which communicates with the first vent hole, between the second plate and the first plate, the second plate having a second vent hole that communicates with the valve chamber and that does not face the first vent hole; and a movable plate having a third vent hole that faces the second vent hole and disposed in the valve chamber such that the movable plate is movable between the first plate and the second plate. The second plate has an auxiliary hole that does not face the third vent hole in the movable plate, the auxiliary hole being surrounded by an edge portion that forms a first corner portion having a substantially convex rounded shape in front view of a principal surface of the second plate at a side facing the valve chamber.

10 Claims, 11 Drawing Sheets

(51) Int. Cl.
  *F04B 43/04* (2006.01)
  *F04B 45/047* (2006.01)
  *F16K 15/02* (2006.01)
  *F16K 99/00* (2006.01)

(52) U.S. Cl.
  CPC ........ *F16K 15/141* (2013.01); *F16K 99/0057* (2013.01); *F16K 2099/0094* (2013.01)

(58) Field of Classification Search
  CPC ......... F16K 2099/0094; F16K 99/0005; F16K 99/0057; F16K 99/0015; F04B 43/02; F04B 43/046; F04B 45/047
  See application file for complete search history.

(56) References Cited

U.S. PATENT DOCUMENTS

| | | |
|---|---|---|
| 2005/0175490 A1 | 8/2005 | Seto et al. |
| 2006/0201327 A1 | 9/2006 | Rensburg et al. |
| 2007/0187634 A1 | 8/2007 | Sneh |
| 2013/0236338 A1* | 9/2013 | Locke .................... F04B 53/10 417/413.1 |

FOREIGN PATENT DOCUMENTS

| | | |
|---|---|---|
| FR | 2508320 A1 * | 12/1982 |
| JP | S56-015474 U | 2/1981 |
| JP | S59122789 A | 7/1984 |
| JP | H04-72479 A | 3/1992 |
| JP | 2006-522896 A | 10/2006 |
| JP | 2007-509291 A | 4/2007 |
| JP | 2013-177901 A | 9/2013 |
| WO | 2005/038321 A1 | 4/2005 |
| WO | 2016/121717 A1 | 8/2016 |

OTHER PUBLICATIONS

Written Opinion for International Application No. PCT/JP2019/010839 dated Jun. 18, 2019.

* cited by examiner

VALVE AND FLUID CONTROL DEVICE INCLUDING VALVE

This is a continuation of International Application No. PCT/JP2019/010839 filed on Mar. 15, 2019 which claims priority from Japanese Patent Application No. 2018-083287 filed on Apr. 24, 2018. The contents of these applications are incorporated herein by reference in their entireties.

BACKGROUND OF THE DISCLOSURE

Field of the Disclosure

The present disclosure relates to a valve and a fluid control device including the valve.

Description of the Related Art

Valves that control flow of fluid in one direction and fluid control devices including the valves have been disclosed (see, for example, International Publication No. 2016/121717 (hereinafter referred to as Patent Document 1)).

The valve according to Patent Document 1 includes a top plate, a bottom plate, and a movable plate arranged to be movable between the top plate and the bottom plate. The top plate has first vent holes, and the bottom plate has second vent holes that do not face the first vent holes. The movable plate has third vent holes that do not face the first vent holes but face the second vent holes. The second vent holes in the bottom plate are connected to a piezoelectric blower.

When air flows into a valve chamber through the first vent holes, the movable plate moves from the top plate toward the bottom plate, and comes into contact with the bottom plate. At this time, the second vent holes in the bottom plate communicate with the third vent holes in the movable plate, and the air flows into the piezoelectric blower through the vent holes. In other words, the air flows from the first vent holes toward the second vent holes. When air flows into the valve chamber through the second vent holes, the movable plate moves from the bottom plate toward the top plate, and comes into contact with the top plate. At this time, the first vent holes in the top plate do not communicate with the third vent holes in the movable plate, so that the air does not flow out of the valve chamber.

The movable plate repeats the above-described movements to provide a valve function of allowing air to flow only in the direction from the first vent holes to the second vent holes and blocking flow in the opposite direction.

The bottom plate of the valve according to Patent Document 1 additionally has auxiliary holes in addition to the second vent holes. The auxiliary holes are positioned so as not to face the third vent holes in the movable plate, and have a function of accelerating the movements of the movable plate to promote opening and closing of the second vent holes.

The valve according to Patent Document 1 is structured such that the movable plate moves in response to a bending movement of a piezoelectric element, and there is a risk that the movable plate will be damaged due to the repeated contact with the top plate and the bottom plate. In particular, the top plate and the bottom plate has the vent holes and the auxiliary holes, and the movable plate is easily damaged when the movable plate comes into contact with edge portions of these holes. When cracks or holes are formed in the movable plate, there is a risk that a normal valve function of causing fluid to flow in one direction cannot be obtained. As a result, there is a risk that the reliability of the valve will be reduced.

BRIEF SUMMARY OF THE DISCLOSURE

Accordingly, it is an object of the present disclosure to solve the above-described problem and provide a valve with improved reliability and a fluid control device including the valve.

To achieve the above-described object, according to preferred embodiments of the present disclosure, a valve includes a first plate having a first vent hole; a second plate defining a valve chamber, which communicates with the first vent hole, between the second plate and the first plate, the second plate having a second vent hole that communicates with the valve chamber and that does not face the first vent hole; and a movable plate having a third vent hole that faces the second vent hole and disposed in the valve chamber such that the movable plate is movable between the first plate and the second plate. The second plate has an auxiliary hole that does not face the third vent hole in the movable plate, the auxiliary hole being surrounded by an edge portion that forms a first corner portion having a substantially convex rounded shape in front view of a principal surface of the second plate at a side facing the valve chamber.

In addition, according to preferred embodiments of the present disclosure, a valve includes a first plate having a first vent hole; a second plate defining a valve chamber, which communicates with the first vent hole, between the second plate and the first plate, the second plate having a second vent hole that communicates with the valve chamber and that does not face the first vent hole; and a movable plate having a third vent hole that faces the second vent hole and disposed in the valve chamber such that the movable plate is movable between the first plate and the second plate. The second plate has an auxiliary hole that does not face the third vent hole in the movable plate. The second plate includes a first principal surface that faces the valve chamber, a second principal surface at a side opposite to the first principal surface, and an inner side surface that connects the first principal surface and the second principal surface so as to form the auxiliary hole. An angle between the inner side surface and the first principal surface is an obtuse angle.

In addition, according to preferred embodiments of the present disclosure, a fluid control device includes a blower and the above-described valve. The blower includes an actuator including a vibrating body and a driving body that generates bending vibration of the vibrating body, the vibrating body having a first principal surface and a second principal surface, and a housing defining a blower chamber together with the actuator such that the vibrating body is disposed between the housing and the actuator in a thickness direction of the vibrating body. The housing has a discharge hole through which the blower chamber communicates with an outside of the housing and a suction hole through which the blower chamber communicates with the outside of the housing. The second vent hole of the valve is connected to the suction hole of the blower.

The valves and the fluid control device according to preferred embodiments of the present disclosure have increased reliability.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Figure 1:
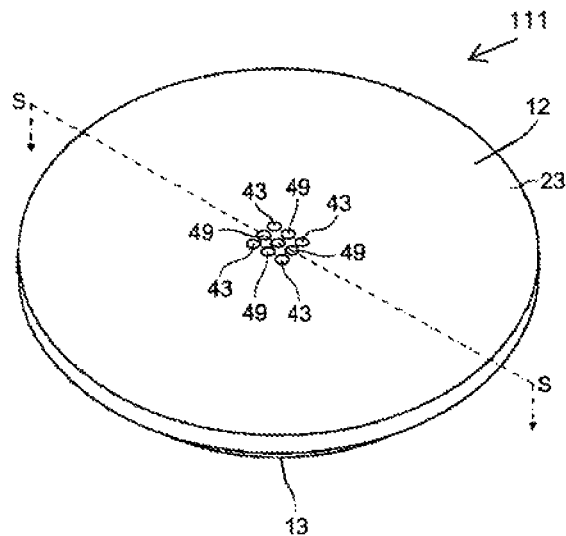
FIG. 1 is an external perspective view of a fluid control device according to a first embodiment viewed from above the fluid control device.

A first aspect of the present disclosure provides a valve including a first plate having a first vent hole; a second plate defining a valve chamber, which communicates with the first vent hole, between the second plate and the first plate, the second plate having a second vent hole that communicates with the valve chamber and that does not face the first vent hole; and a movable plate having a third vent hole that faces the second vent hole and disposed in the valve chamber such that the movable plate is movable between the first plate and the second plate. The second plate has an auxiliary hole that does not face the third vent hole in the movable plate, the auxiliary hole being surrounded by an edge portion that forms a first corner portion having a substantially convex rounded shape in front view of a principal surface of the second plate at a side facing the valve chamber.

According to such a structure, since the corner portion has a substantially convex rounded shape, the movable plate is not easily damaged when the movable plate comes into contact with the corner portion compared to when the corner portion has a concave rounded shape or a linear shape. Accordingly, the damage to the movable plate can be reduced and the service life of the movable plate can be increased. In addition, when the movable plate comes into contact with the second plate, the movable plate easily enters the auxiliary hole and comes into close contact with the second plate. Therefore, the flow passage resistance applied to fluid that flows through the valve chamber can be reduced, so that the flow rate at which the fluid flows through the valve chamber can be increased. Thus, the flow rate of the fluid in the valve chamber can be increased and the reliability of the valve can be improved.

A second aspect of the present disclosure provides the valve according to the first aspect, wherein the substantially convex rounded shape has a radius of greater than or equal to about 0.005 mm and less than or equal to about 0.25 mm. According to such a structure, the flow rate at which the fluid flows through the valve chamber can be effectively increased, and the damage to the movable plate caused when the movable plate comes into contact with the corner portion can be effectively reduced.

A third aspect of the present disclosure provides the valve according to the first or second aspect, wherein the first vent hole is surrounded by an edge portion that forms a second corner portion having a substantially convex rounded shape in front view of a principal surface of the first plate at a side facing the valve chamber. According to such a structure, the damage to the movable plate caused when the movable plate comes into contact with the corner portion can be further reduced, and the service life of the movable plate can be further increased.

A fourth aspect of the present disclosure provides the valve according to any one of the first to third aspects, wherein the second vent hole is surrounded by an edge portion that forms a third corner portion having a substantially convex rounded shape in front view of the principal surface of the second plate at the side facing the valve chamber. According to such a structure, corner portions having a substantially convex rounded shape are provided at the edge portions of not only the auxiliary hole but also the second vent hole in the second plate. In such a case, the corner portions having the substantially convex rounded shape can be simultaneously formed by, for example, immersing the entire body of the second plate in an etching solution.

A fifth aspect of the present disclosure provides a valve including a first plate having a first vent hole; a second plate defining a valve chamber, which communicates with the first vent hole, between the second plate and the first plate, the second plate having a second vent hole that communicates with the valve chamber and that does not face the first vent hole; and a movable plate having a third vent hole that faces the second vent hole and disposed in the valve chamber such that the movable plate is movable between the first plate and the second plate. The second plate has an auxiliary hole that does not face the third vent hole in the movable plate. The second plate includes a first principal surface that faces the valve chamber, a second principal surface at a side opposite to the first principal surface, and an inner side surface that connects the first principal surface and the second principal surface so as to form the auxiliary hole. An angle between the inner side surface and the first principal surface is an obtuse angle. According to such a structure, the movable plate is not easily damaged when the movable plate comes into contact with the corner portion of the second plate. Therefore, the damage to the movable plate can be reduced and the service life of the movable plate can be increased. Thus, the reliability of the valve can be improved.

A sixth aspect of the present disclosure provides a fluid control device including a blower and the valve according to any one of the first to fifth aspects. The blower includes an actuator including a vibrating body and a driving body that generates bending vibration of the vibrating body, the vibrating body having a first principal surface and a second principal surface, and a housing defining a blower chamber together with the actuator such that the vibrating body is disposed between the housing and the actuator in a thickness direction of the vibrating body. The housing has a discharge hole through which the blower chamber communicates with an outside of the housing and a suction hole through which the blower chamber communicate with the outside of the housing. The second vent hole of the valve is connected to the suction hole of the blower. According to such a structure, the flow rate of the fluid in the valve chamber can be increased and the reliability of the valve can be improved.

First Embodiment

A first embodiment of the present disclosure will be described in detail with reference to the drawings.

A fluid control device 111 according to the first embodiment of the present disclosure will now be described.

Figure 2:
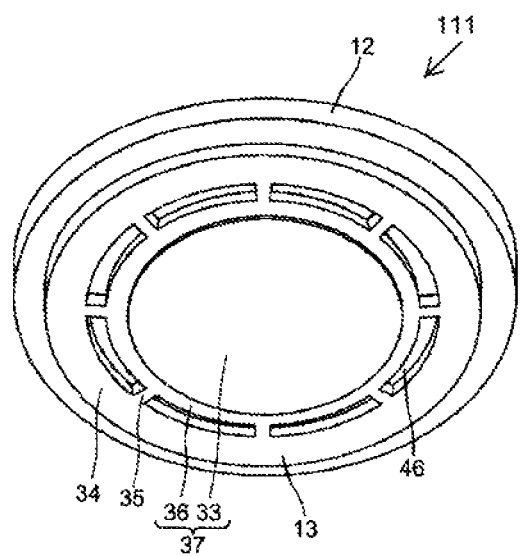
FIG. 2 is an external perspective view of the fluid control device illustrated in FIG. 1 viewed from below the fluid control device.
Figure 3:
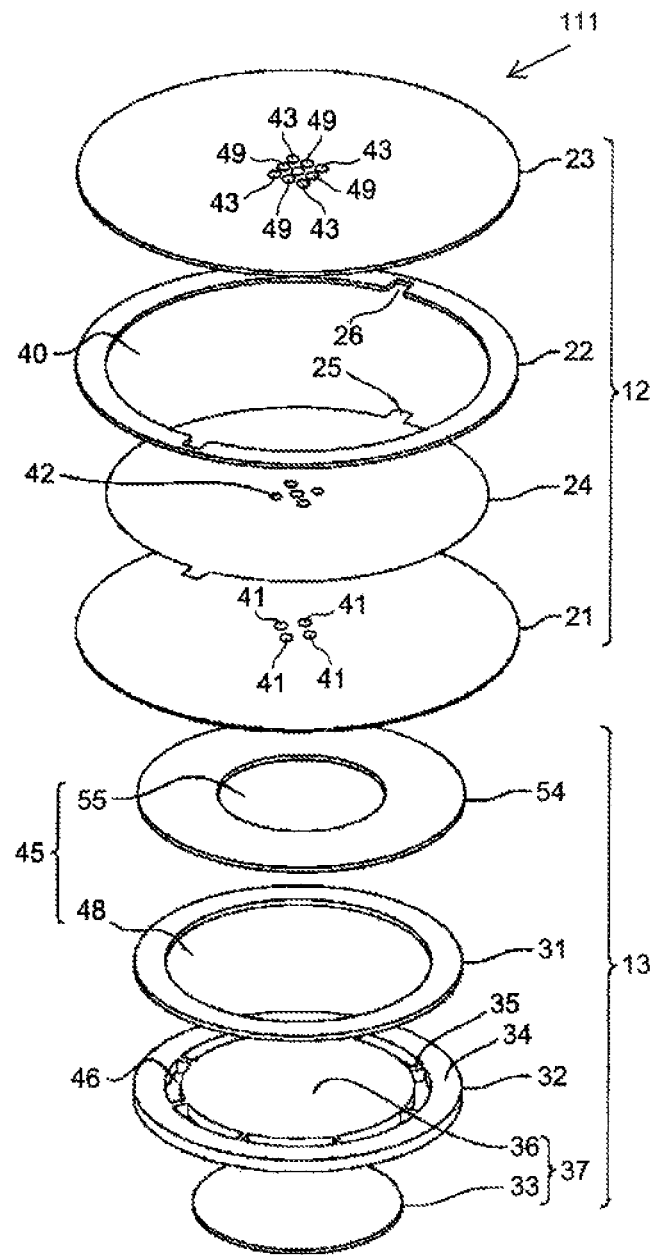
FIG. 3 is an exploded perspective view of the fluid control device illustrated in FIG. 1.
Figure 4:
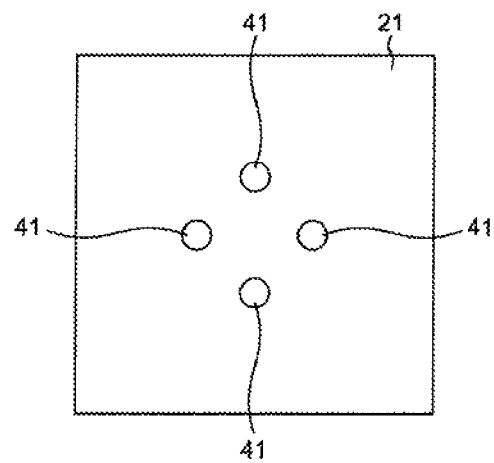
FIG. 4 is a schematic front view of a central portion of a first plate illustrated in FIG. 3.
Figure 5:
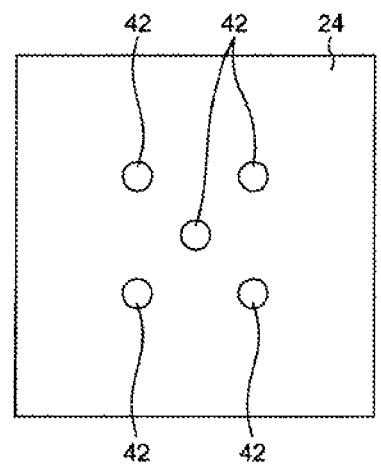
FIG. 5 is a schematic front view of a central portion of a movable plate illustrated in FIG. 3.
Figure 6:
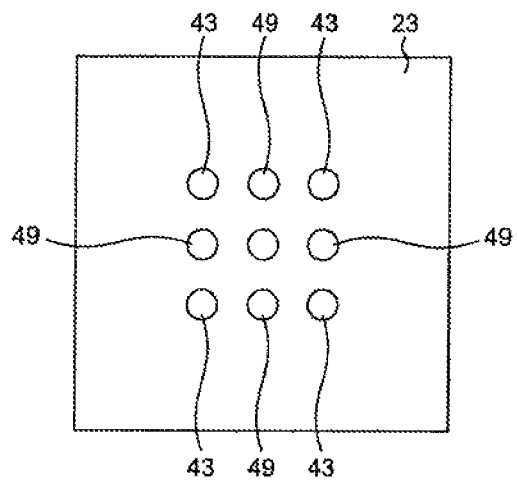
FIG. 6 is a schematic front view of a central portion of a second plate illustrated in FIG. 3.
Figure 7:
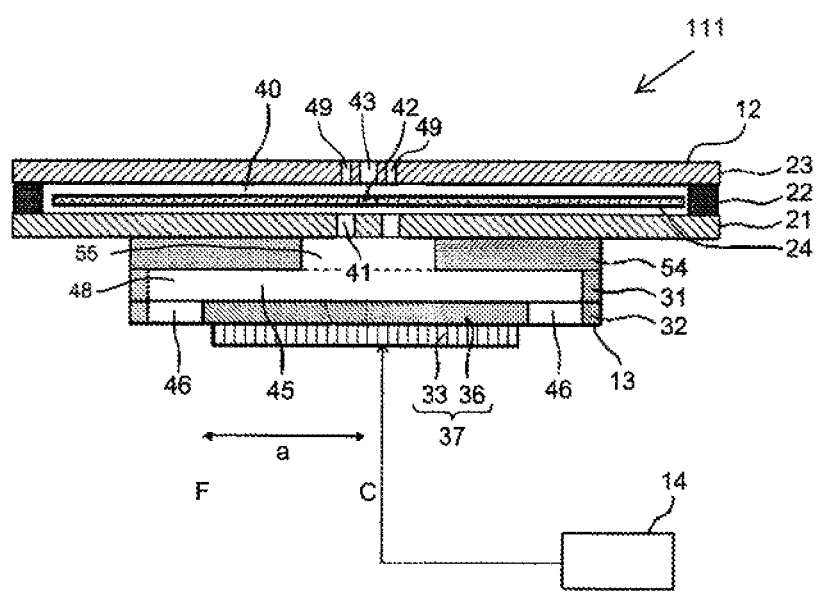
FIG. 7 is a schematic sectional view taken along line S-S in FIG. 1.

FIG. 1 is an external perspective view of the fluid control device 111 according to the first embodiment of the present disclosure viewed from above the fluid control device 111. FIG. 2 is an external perspective view of the fluid control device 111 illustrated in FIG. 1 viewed from below the fluid control device 111. FIG. 3 is an exploded perspective view of the fluid control device 111 illustrated in FIG. 1. FIG. 4 is a front view of a central portion of a first plate 21 illustrated in FIG. 3. FIG. 5 is a front view of a central portion of a movable plate 24 illustrated in FIG. 3. FIG. 6 is a front view of a central portion of a second plate 23 illustrated in FIG. 3. FIG. 7 is a sectional view taken along line S-S in FIG. 1.

FIGS. 4 to 7 and FIGS. 8A and 8B are simplified schematic diagrams of an actual structure.

As illustrated in FIGS. 1 to 3, the fluid control device 111 includes a valve 12, a piezoelectric blower 13, and a controller 14 (see FIG. 7). As illustrated in FIGS. 1 and 3, the valve 12 is disposed at the top of the fluid control device 111. As illustrated in FIGS. 2 and 3, the piezoelectric blower 13 is disposed at the bottom of the fluid control device 111. The valve 12 and the piezoelectric blower 13 are laminated together.

The valve 12 has a function of causing fluid to flow in one direction. The valve 12 has the shape of a cylindrical container having a valve chamber 40 provided therein. As illustrated in FIGS. 1 and 3, the valve 12 includes the first plate 21, a side-wall plate 22, the second plate 23, and movable plate 24.

The valve 12 corresponds to an example of a valve according to the present disclosure. The piezoelectric blower 13 corresponds to an example of a blower according to the present disclosure.

The first plate 21, the side-wall plate 22, and the second plate 23 are made of a metal. For example, the first plate 21, the side-wall plate 22, and the second plate 23 are made of a stainless steel (SUS).

The movable plate 24 is made of a resin. For example, the movable plate 24 is made of a translucent polyimide.

The first plate 21 is provided at the bottom of the valve 12. The side-wall plate 22 is provided between the first plate 21 and the second plate 23. The second plate 23 is disposed at the top of the valve 12. The first plate 21, the side-wall plate 22, and the second plate 23 are laminated together. The movable plate 24 is disposed in the valve 12, that is, in the valve chamber 40.

The first plate 21 is substantially disc-shaped. The side-wall plate 22 is substantially annular when viewed from above. The second plate 23 is substantially disc-shaped. The first plate 21, the side-wall plate 22, and the second plate 23 have the same outer diameter.

The valve chamber 40 has a cylindrical shape. The valve chamber 40 is provided at the center of the side-wall plate 22 and has a predetermined diameter. The movable plate 24 is substantially disc-shaped when viewed from above. The movable plate 24 has a thickness less than that of the side-wall plate 22.

In the first embodiment, the thickness of the side-wall plate 22 (the height of the valve chamber 40) is greater than or equal to about 40 μm and less than or equal to about 50 μm, and the thickness of the movable plate 24 is greater than or equal to about 5 μm and less than or equal to about 10 μm. The movable plate 24 has a small mass so that the movable plate 24 is vertically movable in the valve chamber 40 by the air discharged from the piezoelectric blower 13.

The outer diameter of the movable plate 24 is substantially equal to but is slightly smaller than the opening diameter of the valve chamber 40 in the side-wall plate 22 so that a small gap is provided. Projections 25 are provided on the outer periphery of the movable plate 24 (see FIG. 3).

The side-wall plate 22 has cut portions 26, which receive the projections 25 with small gaps therebetween, in the inner periphery thereof (see FIG. 3). Thus, the movable plate 24 is held in the valve chamber 40 in a non-rotatable and vertically movable manner.

The first plate 21 has a plurality of first vent holes 41 arranged in a predetermined pattern in a central region thereof. The second plate 23 has a plurality of second vent holes 43 and a plurality of auxiliary holes 49 arranged in a predetermined pattern in a central region thereof. The movable plate 24 has a plurality of third vent holes 42 arranged in a predetermined pattern in a central region thereof. Thus, the valve chamber 40 communicates with the outside through the second vent holes 43 and with a blower chamber 45 through the first vent holes 41.

The first vent holes 41 and the second vent holes 43 are arranged so as not to face each other. The auxiliary holes 49 and the first vent holes 41 are arranged to face each other. Each auxiliary hole 49 overlaps the corresponding one of the first vent holes 41 in front view of a principal surface of the second plate 23 at a side opposite to the side adjacent to the valve chamber 40. The central axis of each auxiliary hole 49 coincides with the central axis of the corresponding first vent hole 41.

The third vent holes 42 and the first vent holes 41 are arranged so as not to face each other. The third vent holes 42 and the auxiliary holes 49 are arranged so as not to face each other. The third vent holes 42 and the second vent holes 43 are arranged to face each other.

The piezoelectric blower 13 is a type of pump including a vibrating body 36 that is bent when a voltage is applied to a piezoelectric element 33. As illustrated in FIGS. 2 and 3, the piezoelectric blower 13 has the shape of a cylindrical container in which the blower chamber 45 is provided.

The piezoelectric blower 13 includes a vibration adjustment plate 54, a side-wall plate 31, a vibrating plate 32, and the piezoelectric element 33. The vibration adjustment plate 54, the side-wall plate 31, and the vibrating plate 32 are made of a metal. For example, the vibration adjustment plate 54, the side-wall plate 31, and the vibrating plate 32 are made of a stainless steel.

The side-wall plate 31 is disposed between the vibration adjustment plate 54 and the vibrating plate 32. The vibrating plate 32 is disposed between the side-wall plate 31 and the piezoelectric element 33. The piezoelectric element 33 is disposed at the bottom of the piezoelectric blower 13. The side-wall plate 31 is laminated on the bottom surface of the vibration adjustment plate 54. The side-wall plate 31, the vibrating plate 32, and the piezoelectric element 33 are laminated together.

The vibration adjustment plate 54 is provided to adjust a vibration region of the first plate 21. More specifically, the vibration adjustment plate 54 is bonded between the first plate 21 and the side-wall plate 31. The vibration adjustment plate 54 is substantially annular when viewed from above.

The vibration adjustment plate 54 has a blower upper chamber 55 having a predetermined opening diameter in a central region thereof. The opening diameter of the blower upper chamber 55 is smaller than that of a blower lower chamber 48. The blower upper chamber 55 and the blower lower chamber 48 form the blower chamber 45. The vibration adjustment plate 54 and the side-wall plate 31 have the same outer diameter.

Since the vibration adjustment plate 54 is provided on the first plate 21, the rigidity can be locally increased at the outer peripheral portion of the first plate 21. Accordingly, the first plate 21 can be set so that only a central portion thereof that faces the blower upper chamber 55 vibrates and the outer peripheral portion thereof hardly vibrates.

Thus, the region in which the first plate 21 vibrates can be set in accordance with the opening diameter of the blower upper chamber 55 in the vibration adjustment plate 54. Accordingly, the vibration region and structural resonant frequency of the first plate 21 can be easily adjusted without changing, for example, the thickness or the outer diameter of the first plate 21.

The vibration of the central portion of the first plate 21 mainly contributes to vibrations of the fluid and the movable plate 24. Therefore, even when the outer peripheral portion of the first plate 21 does not vibrate, the responsiveness and the suction flow rate of the valve 12 can be sufficiently increased.

The side-wall plate 31 is substantially annular when viewed from above. The side-wall plate 31 has a blower lower chamber 48 having a predetermined opening diameter in a central region thereof.

The vibrating plate 32 includes an outer peripheral portion 34, a plurality of beam portions 35, and a vibrating body 36.

The outer peripheral portion 34 is substantially annular. The vibrating body 36 is substantially disc-shaped. The vibrating body 36 is disposed in an opening in the outer peripheral portion 34 with a gap provided between the vibrating body 36 and the outer peripheral portion 34. The beam portions 35 are disposed in the gap between the outer peripheral portion 34 and the vibrating body 36, and extend in radial directions of the vibrating plate 32 to connect the vibrating body 36 to the outer peripheral portion 34.

Thus, the vibrating body 36 is supported in midair by the beam portions 35, and is vertically movable in the thickness direction. The clearances (cavities) between the outer peripheral portion 34 and the vibrating body 36 serve as suction holes 46.

The side-wall plate 31 and the outer peripheral portion 34 of the vibrating plate 32 have the same outer diameter and the same opening diameter. The outer diameter of the side-wall plate 31 and the vibrating plate 32 is smaller than the outer diameter of the valve 12 by a predetermined amount.

The piezoelectric element 33 is substantially disc-shaped and has a radius smaller than that of the vibrating body 36 when viewed from above. The piezoelectric element 33 is bonded to the bottom surface of the vibrating body 36. The piezoelectric element 33 is made of, for example, a lead zirconate titanate (PZT) ceramic. The piezoelectric element 33 is made of a piezoelectric material, and is therefore highly responsive. Accordingly, the piezoelectric element 33 can be driven at a high frequency.

Electrodes (not shown) are formed on both principal surfaces of the piezoelectric element 33, and the controller 14 applies a driving voltage to the piezoelectric element 33 across these electrodes. The piezoelectric element 33 has piezoelectricity and therefore expands and contracts in a planar direction in accordance with the driving voltage applied thereto.

When the driving voltage is applied to the piezoelectric element 33, the piezoelectric element 33 expands and contracts in the planar direction, and concentric bending vibration of the vibrating body 36 is generated. The bending vibration causes the beam portions 35, which elastically support the vibrating body 36, to vibrate, and accordingly the vibrating body 36 vibrates in the vertical direction. Thus, the piezoelectric element 33 and the vibrating body 36 form an actuator 37 and vibrate together.

The controller 14 is composed of, for example, a microcomputer. In the first embodiment, the controller 14 adjusts the driving frequency of the piezoelectric element 33 to the resonant frequency of the blower chamber 45. The resonant frequency of the blower chamber 45 is a frequency at which resonance occurs between the pressure vibration generated at the center of the blower chamber 45 and the pressure vibration that reaches the center of the blower chamber 45 after being generated at the center of the blower chamber 45, propagated to the outer peripheral portion, and reflected by the outer peripheral portion.

When such an adjustment is made, a region around the center in the planar direction serves as an anti-node of the bending vibration, and a region near the outer periphery in the planar direction serves as a node of the bending vibration. Thus, a pressure distribution in the form of a standing wave in the planar direction is generated in the blower chamber 45.

Thus, the pressure variation of the fluid is large in a region near the first vent holes 41 that face the central portion of the blower chamber 45 in the planar direction, and hardly occurs in a region near the suction holes 46 that face the outer peripheral portion of the blower chamber 45 in the planar direction.

Therefore, by forming the suction holes 46 such that the suction holes 46 communicate with the outer peripheral portion of the blower chamber 45 in the planar direction, the pressure loss through the suction holes 46 can be substantially eliminated even when the suction holes 46 are not provided with a valve or the like. Accordingly, the suction holes 46 can be formed in any shape and size, and the flow rate of the fluid can be increased.

The piezoelectric element 33 corresponds to an example of a driving body according to the present disclosure. The first plate 21, the vibration adjustment plate 54, and the side-wall plate 31 form an example of a housing according to the present disclosure.

The flow of air in the fluid control device 111 while the piezoelectric blower 13 is in operation will now be described.

Figure 8A:
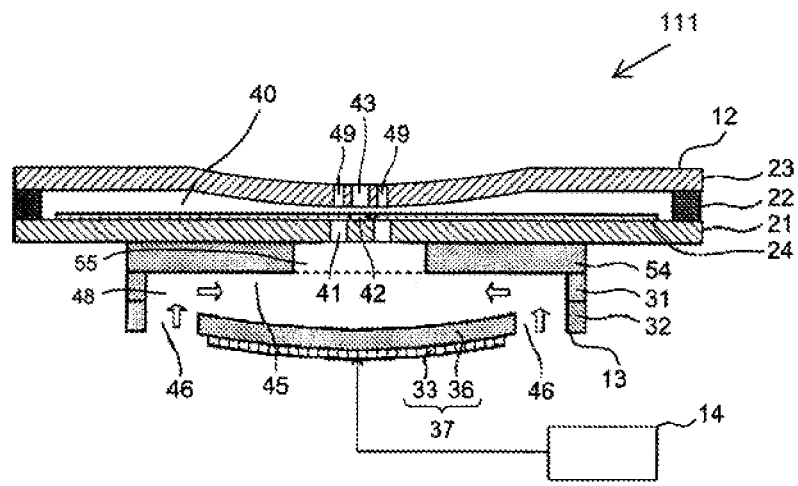
FIG. 8A is a schematic sectional view of the fluid control device illustrated in FIG. 1 taken along line S-S when the fluid control device is operated at the frequency of the first mode.
Figure 8B:
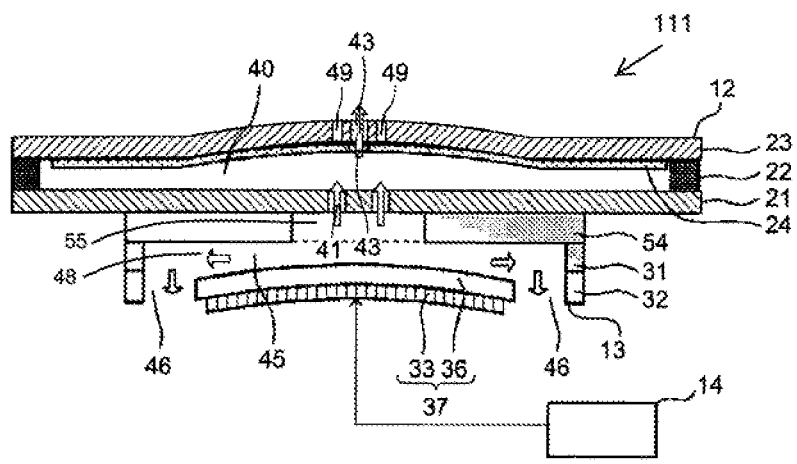
FIG. 8B is another schematic sectional view of the fluid control device illustrated in FIG. 1 taken along line S-S when the fluid control device is operated at the frequency of the first mode.
Figure 9:
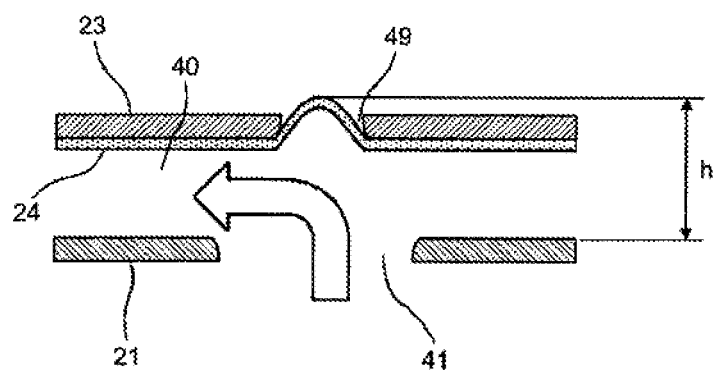
FIG. 9 is a schematic enlarged sectional view illustrating flow of air around an auxiliary hole at the instant of FIG. 8B.

FIGS. 8A and 8B are side sectional views illustrating the flow of air in the fluid control device 111 while the piezoelectric blower 13 illustrated in FIG. 1 is in operation. FIG. 9 is an enlarged sectional view showing the flow of air around each auxiliary hole 49 at the instant of FIG. 8B. The arrows in FIGS. 8A, 8B, and 9 show the flow of air.

When the controller 14 applies an alternating-current driving voltage across the electrodes on both principal surfaces of the piezoelectric element 33 at the frequency of the first mode (fundamental wave) in the state illustrated in FIG. 7, the piezoelectric element 33 expands and contracts, thereby generating concentric bending vibration of the vibrating body 36 at a resonant frequency f of the first mode. Accordingly, as illustrated in FIGS. 8A and 8B, the actuator 37 is bent and the volume of the blower chamber 45 periodically changes.

When the vibrating body 36 is bent downward as illustrated in FIG. 8A, the movable plate 24 is pulled toward the first plate 21 in the valve chamber 40 and comes into contact with the first plate 21.

Accordingly, the first vent holes 41 are blocked by the movable plate 24. As a result, the flow of air from the valve chamber 40 to the blower chamber 45 is blocked, and air accumulates in the blower chamber 45.

When the vibrating body 36 is bent upward as illustrated in FIG. 8B, the pressure in the blower chamber 45 increases, and a discharge flow that flows into the valve chamber 40 through the first vent holes 41 is generated. The discharge flow pushes the movable plate 24 upward so that the movable plate 24 comes into contact with the second plate 23.

At this time, the movable plate 24 blocks only the auxiliary holes 49 and does not block the second vent holes 43. Therefore, the air in the blower chamber 45 is sucked into the valve chamber 40 through the first vent holes 41, and flows to the outside through the second vent holes 43.

The second plate 23 of the valve 12 is vibrated due to the vibration of the actuator 37 that is transmitted thereto from the piezoelectric blower 13 directly or indirectly through the air.

Accordingly, the second plate 23 is also elastically deformed to move vertically in the thickness direction. As illustrated in FIG. 8B, when the actuator 37 is bent upward and the air in the blower chamber 45 is discharged to the outside through the second vent holes 43, the second plate 23 is also bent upward, similarly to the actuator 37. As a result, the volume of the valve chamber 40 increases.

As illustrated in FIG. 8A, when the actuator 37 is bent downward, the second plate 23 is also bent downward as rebound from the state illustrated in FIG. 8B. As a result, the volume of the valve chamber 40 decreases.

Accordingly, the moving distance and the moving time of the movable plate 24 are reduced when the movable plate 24 is pulled downward in the valve chamber 40. This allows the movable plate 24 to move in accordance with the air pressure variation, and the responsiveness of the valve 12 is increased.

The first plate 21 may also be vibrated due to the vibration of the actuator 37 that is transmitted thereto from the piezoelectric blower 13 directly or indirectly through the air.

Referring to FIG. 9, at the instant of FIG. 8B during the operation of the piezoelectric blower 13, a portion of the movable plate 24 that faces each first vent hole 41 is deformed into the corresponding auxiliary hole 49 due to the discharge flow that flows into the valve chamber 40 through the first vent hole 41. Accordingly, the gap h between the first plate 21 and the movable plate 24 increases. Thus, the flow passage resistance of the valve 12 is lower and the flow rate of the air is higher than when the second plate 23 does not have the auxiliary holes 49.

Thus, the valve 12 of the fluid control device 111 is capable of passing air therethrough with the smallest possible reduction in the flow rate of the air discharged to the outside.

Figure 10A:
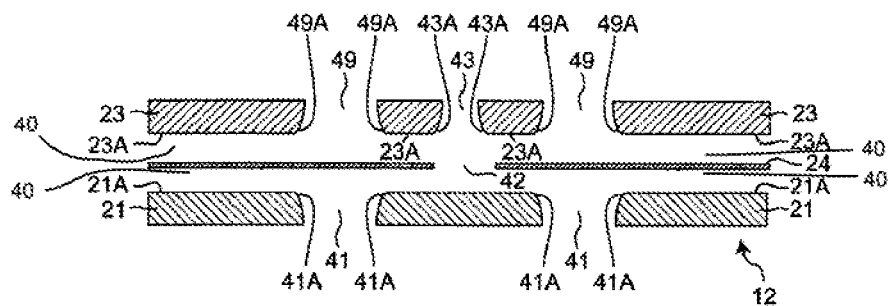
FIG. 10A is a schematic vertical sectional view of a valve (non-operated state)
Figure 10B:
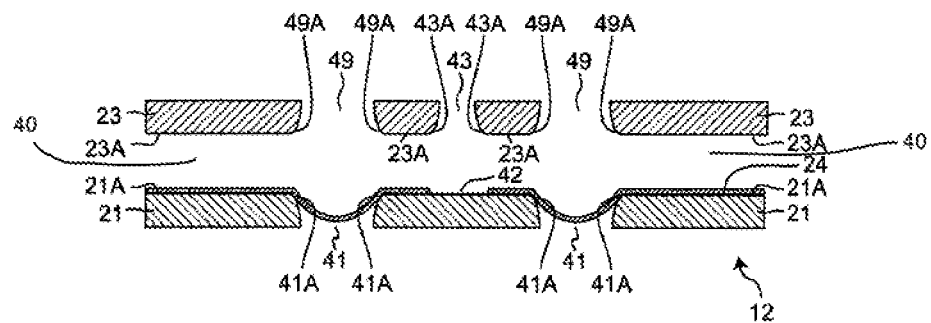
FIG. 10B is a schematic vertical sectional view of the valve (state in which the movable plate is in contact with the first plate in operation)
Figure 10C:
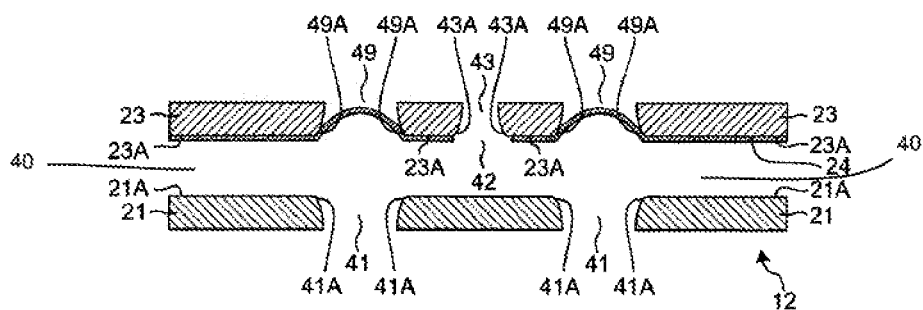
FIG. 10C is a schematic vertical sectional view of the valve (state in which the movable plate is in contact with the second plate in operation)

In the first embodiment, the shapes of the auxiliary holes 49, the first vent holes 41, and the second vent holes 43 are devised. This will be described in more detail with reference to the schematic diagrams of FIGS. 10A to 10C. FIGS. 10A to 10C are schematic vertical sectional views of the valve 12. FIG. 10A illustrates a non-operated state. FIG. 10B illustrates a state in which the movable plate 24 is in contact with a principal surface 21A of the first plate 21 in operation. FIG. 10C illustrates a state in which the movable plate 24 is in contact with a principal surface 23A of the second plate 23 in operation.

As illustrated in FIG. 10A, the auxiliary holes 49, the first vent holes 41, and the second vent holes 43 are respectively provided with corner portions 49A, corner portions 41A, and corner portions 43A. The corner portions 49A are formed of edge portions surrounding the auxiliary holes 49 in front view of the principal surface 23A of the second plate 23 at a side facing the valve chamber 40. Similarly, the corner portions 41A are formed of edge portions surrounding the first vent holes 41 in front view of the principal surface 21A of the first plate 21 at a side facing the valve chamber 40. Similarly, the corner portions 43A are formed of edge portions surrounding the second vent holes 43 in front view of the principal surface 23A of the second plate 23 at a side facing the valve chamber 40.

Referring to FIG. 10A, the corner portions 49A, 41A, and 43A each have a substantially convex rounded shape in cross section. The substantially convex rounded shape is a shape that is gently convexly curved. The substantially convex rounded shape may be formed by, for example, immersing the first plate 21 and the second plate 23 in an etching solution and etching the corner portions 49A, the corner portions 41A, and the corner portions 43A. According to this method, in particular, the corner portions 49A of the auxiliary holes 49 in the second plate 23 and the corner portions 43A of the second vent holes 43 in the second plate 23 can be simultaneously formed in the substantially convex rounded shape. The sizes of the substantially convex rounded shapes of the corner portions 49A, 41A, and 43A, that is, the radii of the substantially convex rounded shapes, can be adjusted by adjusting the time of immersion in the etching solution.

According to the above-described structure, the damage to the movable plate 24 caused when the movable plate 24 comes into contact with the first plate 21 and the second plate 23 can be reduced. More specifically, when the movable plate 24 comes into contact with the principal surface 21A of the first plate 21 as illustrated in FIG. 10B, the movable plate 24 comes into contact with the corner portions 41A of the first vent holes 41. As described above, the corner portions 41A have a substantially convex rounded shape, and therefore the damage to the movable plate 24 is less than when the corner portions 41A have a concave rounded shape or a sharp shape. Similarly, when the movable plate 24 comes into contact with the principal surface 23A of the second plate 23 as illustrated in FIG. 10C, the movable plate 24 comes into contact with the corner portions 49A of the auxiliary holes 49. As described above, the corner portions 49A have a substantially convex rounded shape, and therefore the damage to the movable plate 24 is less than when the corner portions 49A have a concave rounded shape or a sharp shape.

Since the damage to the movable plate 24 is reduced as described above, the service life of the movable plate 24 can be increased and the reliability of the valve 12 can be improved.

When the movable plate 24 is in contact with the principal surface 23A of the second plate 23, the third vent holes 42 in the movable plate 24 and the second vent holes 43 communicate with each other to allow air to flow therethrough. At this time, as described above, the movable plate 24 is preferably brought into close contact with the second plate 23 to increase the flow rate of the air that flows through the valve chamber 40. In the first embodiment, the corner portions 49A have a smooth substantially convex rounded shape in cross section. Therefore, when the movable plate 24 comes into contact with the second plate 23, the movable plate 24 easily moves into the auxiliary holes 49. Accordingly, the movable plate 24 can be brought into closer contact with the second plate 23, and the flow rate of air that flows through the valve chamber 40 can be increased.

The inventors of the present disclosure have found that, during the operation of the valve 12 and the fluid control device 111, a greater impact occurs when the movable plate 24 comes into contact with the second plate 23 than when the movable plate 24 comes into contact with the first plate 21. Accordingly, the damage to the movable plate 24 can be more effectively reduced by forming the edge portions of, in particular, the auxiliary holes 49 in the second plate 23 that face the movable plate 24 in a substantially convex rounded shape among the holes formed in the first plate 21 and the second plate 23.

As described above, according to the first embodiment, the edge portions surrounding, in particular, the auxiliary holes 49 in the second plate 23 form the corner portions 49A having a substantially convex rounded shape, so that the flow rate of air that flows through the valve chamber 40 can be increased. In addition, the service life of the movable plate 24 can be increased and the reliability of the valve 12 can be improved.

In addition, in the first embodiment, the edge portions surrounding the first vent holes 41 in the first plate 21 form the corner portions 41A having a substantially convex rounded shape. Accordingly, the damage to the movable plate 24 caused when the movable plate 24 comes into contact with the corner portions 41A can be reduced, and the service life of the movable plate 24 can be further increased.

In addition, in the first embodiment, not only the corner portions 49A of the auxiliary holes 49 but also the corner portions 43A of the second vent holes 43 in the second plate 23 are formed in a substantially convex rounded shape. The second vent holes 43 are positioned to face the third vent holes 42 in the movable plate 24, and therefore the corner portions 43A of the second vent holes 43 do not cause a large amount of the damage to the movable plate 24. However, the corner portions 49A and 43A may be etched and formed in a substantially convex rounded shape together by, for example, immersing the second plate 23 in an etching solution.

Figure 11:
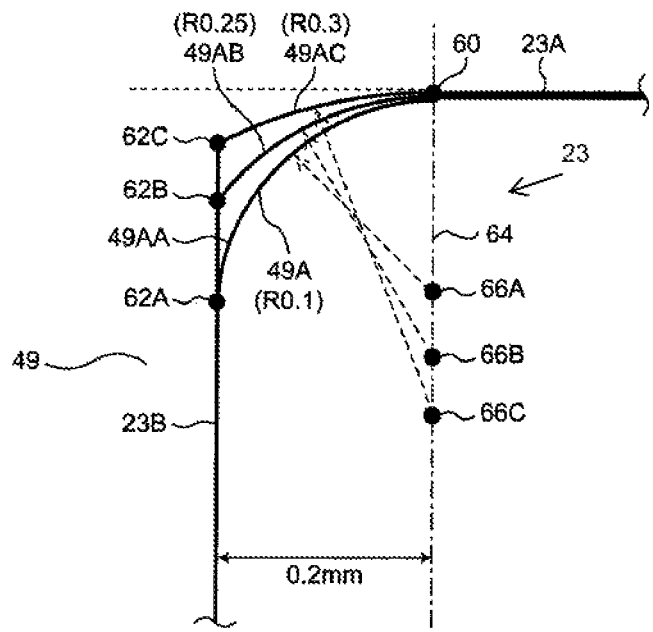
FIG. 11 is a schematic enlarged view of examples of a corner portion of an auxiliary hole.

The radius of the substantially convex rounded shape will now be described with reference to FIG. 11. FIG. 11 is a schematic enlarged view illustrating examples of the corner portion 49A of each auxiliary hole 49.

The schematic diagram of FIG. 11 illustrates three corner portions 49AA, 49AB, and 49AC as examples of the corner portion 49A. The corner portions 49AA, 49AB, and 49AC have substantially convex rounded shapes with different radii. More specifically, the corner portion 49AA has a radius of 0.1 mm (R0.1), the corner portion 49AB has a radius of 0.25 mm (R0.25), and the corner portion 49AC has a radius of 0.3 mm (R0.3).

Each of the corner portions 49AA, 49AB, and 49AC adjoins the principal surface 23A of the second plate 23 at the top thereof, and adjoins an inner side surface 23B of the second plate 23 at a side thereof. In the example illustrated in FIG. 11, the corner portions 49AA, 49AB, and 49AC are connected to the principal surface 23A at the same inflection point 60. The corner portions 49AA, 49AB, and 49AC are connected to the inner side surface 23B at an inflection point 62A, an inflection point 62B, and an inflection point 62C arranged in that order from the bottom. The inflection point 62A is a connection point between the corner portion 49AA and the inner side surface 23B. The inflection point 62B is a connection point between the corner portion 49AB and the inner side surface 23B. The inflection point 62C is a connection point between the corner portion 49AC and the inner side surface 23B.

The corner portions 49AA, 49AB, and 49AC respectively have centers 66A, 66B, and 66C. The centers 66A, 66B, and 66C are all on a vertical reference line 64 that passes through the inflection point 60. In the example illustrated in FIG. 11, the horizontal distance from the inner side surface 23B to the reference line 64 is 0.2 mm. As illustrated in FIG. 11, the radius of the substantially convex rounded shape of the corner portion 49AA is the distance from the center 66A to the corner portion 49AA, and is 0.2 mm. Similarly, the radius of the substantially convex rounded shape of the corner portion 49AB is the distance from the center 66B to the corner portion 49AB, and is 0.25 mm, and the radius of the substantially convex rounded shape of the corner portion 49AC is the distance from the center 66C to the corner portion 49AC, and is 0.3 mm.

The examples of the corner portion 49A illustrated in FIG. 11 each have an arc shape with a constant curvature. However, in practice, the corner portion 49A may not have an accurate arc shape but have a substantially convex rounded shape including some irregularities. Since the shape of the corner portion 49A may vary as described above, the radius of the corner portion 49A may be measured by, for example, a method illustrated in FIG. 12. Similar to FIG. 11, FIG. 12 is also a schematic enlarged view of the corner portion 49A of each auxiliary hole 49.

Figure 12:
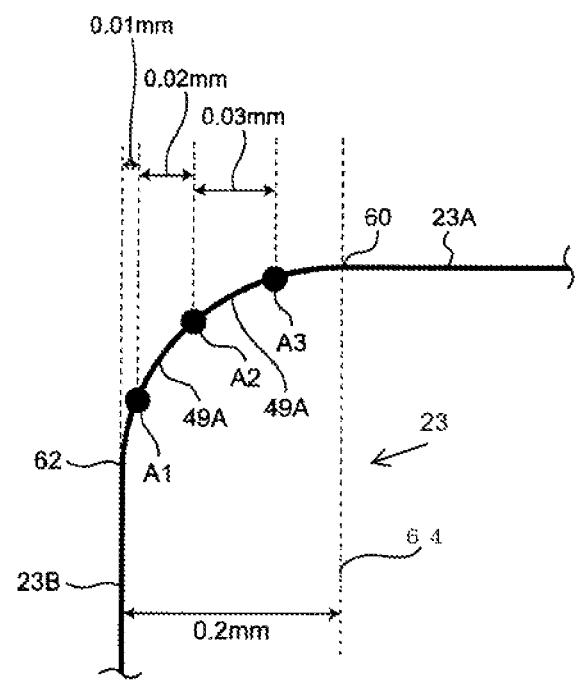
FIG. 12 is a schematic enlarged view of a corner portion of an auxiliary hole.

In the example illustrated in FIG. 12, the radius of the substantially convex rounded shape is measured at three points: point A1, point A2, and point A3. Point A1 is a point on the corner portion 49A at which the horizontal distance from the inner side surface 23B of the second plate 23 is 0.01 mm. Point A2 is a point on the corner portion 49A at which the horizontal distance from point A1 is 0.02 mm, and point A3 is a point on the corner portion 49A at which the horizontal distance from point A2 is 0.03 mm. In the first embodiment, the radius of the substantially convex rounded shape is calculated for each of point A1, point A2, and point A3, and the average of the calculated radii is determined as the radius of the substantially convex rounded shape of the corner portion 49A. According to this calculation method, the radius of the substantially convex rounded shape can be accurately calculated for the corner portion 49A that may have various shapes.

The number of points for which the radius is calculated is not limited to three, and may instead be another number. In addition, the horizontal distance from the inner side surface 23B of the second plate 23 to each point may be set to any distance. For example, the positions of point A1, point A2, and point A3 may be adjusted in accordance with the horizontal distance from the inner side surface 23B to the reference line 64 (0.2 mm in FIG. 12).

Figure 13A:
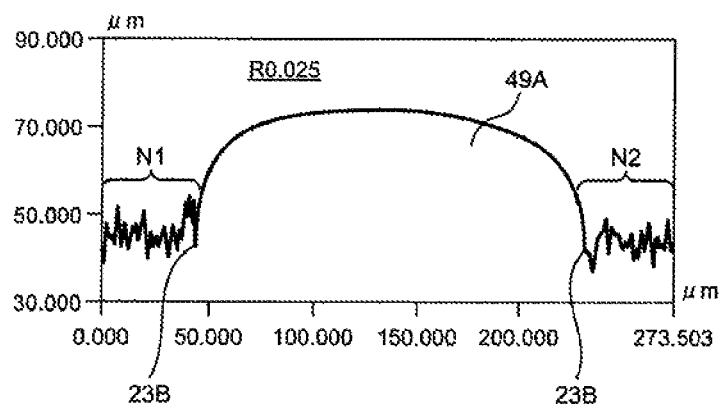
FIG. 13A illustrates a corner portion having a substantially convex rounded shape observed with an electron microscope (R 0.025 mm)
Figure 13B:
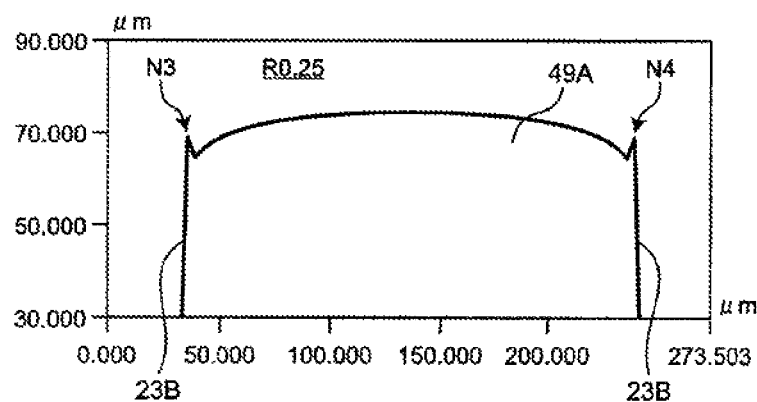
FIG. 13B illustrates a corner portion having a substantially convex rounded shape observed with an electron microscope (R 0.25 mm)

FIGS. 13A and 13B show examples of the corner portions 49A having substantially convex rounded shapes that were formed in practice and observed with an electron microscope. FIG. 13A shows an example of a corner portion 49A having a substantially convex rounded shape with a radius of 0.025 mm (R0.025), and FIG. 13B shows an example of a corner portion 49A having a substantially convex rounded shape with a radius of 0.25 mm (R0.25).

In these examples, second plates 23 made of SUS and having predetermined dimensions were prepared, and were immersed in an etching solution for a predetermined time to etch the corner portions 49A into substantially convex rounded shapes having desired radii. The shapes of the thus-formed corner portions 49A were observed by using an electron microscope, which was a laser microscope VK-X150 produced by Keyence Corporation. FIGS. 13A and 13B show the shapes of the corner portions 49A observed by using the microscope.

Referring to FIGS. 13A and 13B, the corner portions 49A have noises N1, N2, N3, and N4. The inner side surfaces 23B were determined in consideration of these noises N1, N2, N3, and N4, and the radii of the substantially convex rounded shapes were calculated by the method described above with reference to FIG. 12. As a result, the radius of the substantially convex rounded shape of the corner portion 49A shown in FIG. 13A was calculated to be about 0.025 mm, and the radius of the substantially convex rounded shape of the corner portion 49A illustrated in FIG. 13B was calculated to be about 0.25 mm. Thus, the actual radii of the substantially convex rounded shapes were calculated.

An experiment regarding the service life of the movable plate 24 was performed by using the valve 12 according to the first embodiment. The result of the experiment will be described with reference to FIG. 14.

Figure 14:
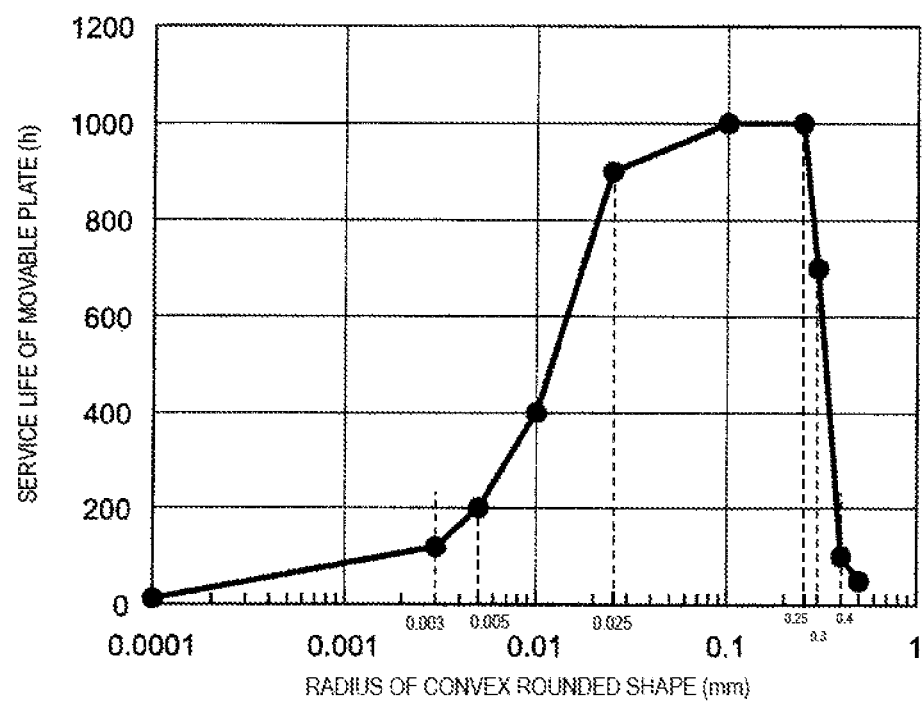
FIG. 14 is a graph showing the relationship between the radius of the substantially convex rounded shape of each corner portion and the service life of the valve.

FIG. 14 shows the result of the experiment in which the radius of the substantially convex rounded shape of the corner portions 49A of the valve 12 was varied and the time for which the valve 12 was continuously driven before the movable plate 24 stopped to operate normally, that is, the service life of the movable plate 24, was determined. In FIG. 14, the horizontal axis represents the radius of the substantially convex rounded shape on a logarithmic scale (unit is mm), and the vertical axis represents the service life of the movable plate 24 (unit is hour).

As illustrated in FIG. 14, the service life of the movable plate 24 increases as the radius of the substantially convex rounded shape is gradually increased, and then decreases when the radius of the substantially convex rounded shape is further increased. In other words, the service life of the valve 12 can be increased by setting the radius of the substantially convex rounded shape in a predetermined range. More specifically, the service life of the valve 12 can be increased to about 200 hours or more when the radius of the substantially convex rounded shape is greater than or equal to about 0.005 mm and less than or equal to about 0.25 mm. Furthermore, the service life of the valve 12 can be increased to about 400 hours or more when the radius of the substantially convex rounded shape is greater than or equal to about 0.01 mm and less than or equal to about 0.25 mm.

More specifically, when the radius of the substantially convex rounded shape is greater than or equal to about 0.005 mm, the corner portions 49A are sufficiently rounded to allow the movable plate 24 to easily enter the auxiliary holes 49. Accordingly, the flow rate of the fluid that flows through the valve chamber 40 can be effectively increased. When the radius of the substantially convex rounded shape is less than or equal to about 0.25 mm, the boundary between each corner portion 49A and a portion other than the corner portion 49A (see inflection points 62B and 62C in FIG. 11) can be prevented from having a sharp edge. Accordingly, the damage to the movable plate 24 caused when the movable plate 24 comes into contact with the corner portions 49A can be effectively reduced.

Second Embodiment

A valve according to a second embodiment of the present disclosure will now be described. In the second embodiment, differences from the first embodiment will be mainly described. In addition, the descriptions that are the same as those in the first embodiment will be omitted.

Figure 15:
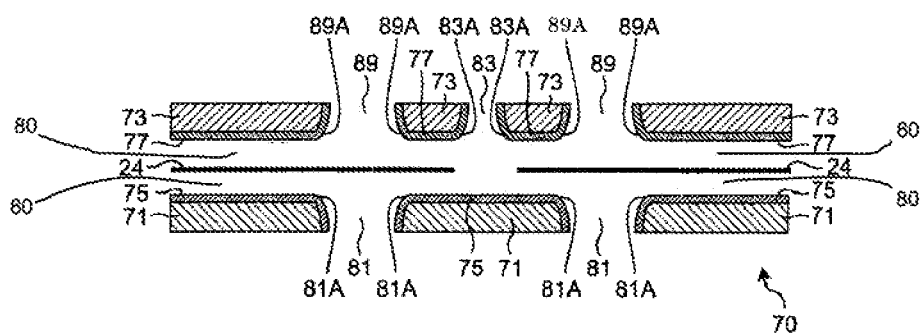
FIG. 15 is a schematic vertical sectional view of a valve according to a second embodiment.

FIG. 15 is a schematic vertical sectional view of a valve 70 according to a second embodiment. As illustrated in FIG. 15, the second embodiment mainly differs from the first embodiment in that coating materials 75 and 77 are formed on surfaces of a first plate 71 and a second plate 73.

In the second embodiment, the coating materials 75 and 77 are made of a resin. The coating materials 75 and 77 are formed by applying molten resin to the surfaces of the first plate 71 and the second plate 73 and drying the resin for a predetermined time.

The coating material 75 and the first plate 71 together form first vent holes 81 and corner portions 81A that surround the first vent holes 81. The coating material 77 and the second plate 73 together form second vent holes 83, corner portions 83A that surround the second vent holes 83, auxiliary holes 89, and corner portions 89A that surround the auxiliary holes 89.

According to the second embodiment, similar to the first embodiment, the corner portions 81A, 83A, and 89A have a substantially convex rounded shape in cross section. Accordingly, effects similar to those of the valve 12 according to the first embodiment can be obtained. More specifically, the flow rate of air that flows through a valve chamber 80 can be increased, and the reliability of the valve 70 can be improved.

Figure 16:
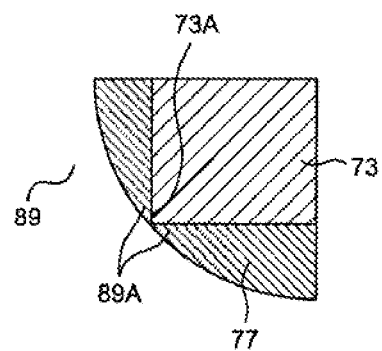
FIG. 16 is a schematic enlarged view of a corner portion according to the second embodiment.

FIG. 16 is a schematic enlarged view of one of the corner portions 89A, which will be described as an example. As illustrated in FIG. 16, the second plate 73 has a corner portion 73A that is right-angled in cross section. The coating material 77 covers the corner portion 73A to form the corner portion 89A having a smooth substantially convex rounded shape in cross section. The substantially convex rounded shape is formed when molten resin applied to the corner portion 73A of the second plate 73 is dried. The radius of the substantially convex rounded shape is reduced as the time for which the applied resin is dried is reduced. The radius of the substantially convex rounded shape is increased as the time for which the applied resin is dried is increased. Thus, the radius of the substantially convex rounded shape can be set to a desired value by adjusting the drying time of the resin.

Figure 17:
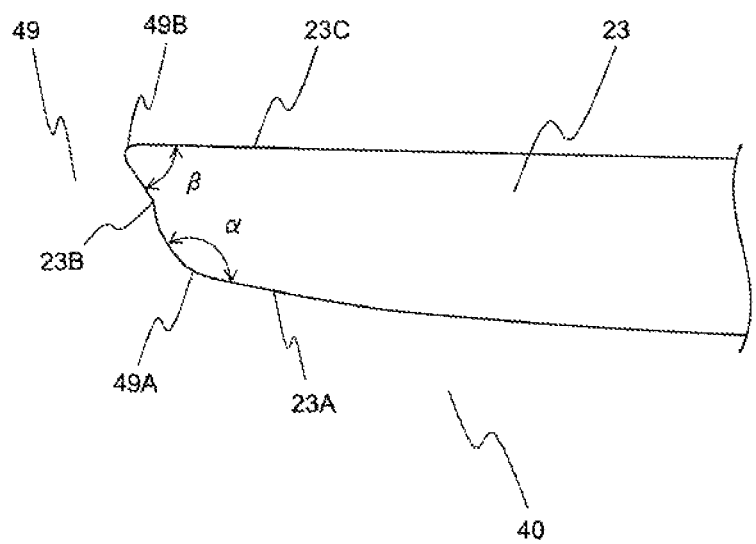
FIG. 17 is a schematic enlarged view of a corner portion of the second plate according to the first embodiment.

FIG. 17 is a schematic enlarged view of one of the corner portions 49A illustrated in FIGS. 10A to 10C, which will be described as an example. As illustrated in FIG. 17, the second plate 23 has a principal surface 23C at a side opposite to the principal surface 23A that faces the valve chamber 40. The principal surface 23A will be referred to as a first principal surface 23A, and the principal surface 23C will be referred to as a second principal surface 23C. The inner side surface 23B is provided as a side surface portion that connects the first principal surface 23A and the second principal surface 23C so as to form the auxiliary hole 49. In this structure, the corner portion (the third corner portion) 49A is provided between the first principal surface 23A and the inner side surface 23B, and a corner portion (the fourth corner portion) 49B is provided between the second principal surface 23C and the inner side surface 23B. As illustrated in FIG. 17, when the corner portion 49A has an angle of α and the corner portion 49B has an angle of β, α is an obtuse angle and β is an acute angle. The reason why α is an obtuse angle and β is an acute angle is because the second plate 23 is etched from the first principal surface 23A when the auxiliary hole 49 is formed in the second plate 23.

Since the angle α between the first principal surface 23A and the inner side surface 23B is an obtuse angle, the movable plate 24 is not easily damaged when the movable plate 24 comes into contact with the corner portion 49A. Accordingly, the service life of the movable plate 24 can be increased. Thus, the reliability of the valve 12 can be improved.

Although the present disclosure has been described with reference to the first and second embodiments, the present disclosure is not limited to the above-described first and second embodiments. For example, although the corner portions 49A of the auxiliary holes 49, the corner portions 41A of the first vent holes 41, and the corner portions 43A of the second vent holes 43 all have a substantially convex rounded shape in the above-described first embodiment, the present disclosure is not limited to this. The flow rate of air that flows through the valve chamber 40 can be effectively increased and the reliability of the valve 12 can be effectively improved when at least the corner portions 49A of the auxiliary holes 49 have a substantially convex rounded shape.

In addition, although the corner portions are formed in a substantially convex rounded shape by immersion in an etching solution in the first and second embodiments, the method for forming the substantially convex rounded shape is not limited to this. The substantially convex rounded shape may instead be formed by, for example, electrolytic polishing, pressing, or forging.

In addition, although air is used as the fluid in the first and second embodiments, the fluid is not limited to this, and may instead be gas other than air.

In addition, although the plates included in the valve 12 and the piezoelectric blower 13 are made of SUS in the first and second embodiments, the plates are not limited to this. The plates may instead be made of other materials, such as aluminum, titanium, magnesium, or copper.

In addition, although the piezoelectric element 33 is provided as the drive source for the piezoelectric blower 13 in the first and second embodiments, the drive source is not limited to this. For example, a piezoelectric blower that is electromagnetically driven to perform a pumping operation may instead be used.

In addition, although the piezoelectric element 33 is made of a lead zirconate titanate (PZT) ceramic in the first and second embodiments, the piezoelectric element 33 is not limited to this. The piezoelectric element 33 may instead be made of, for example, a lead-free piezoelectric ceramic material, such as a potassium sodium niobate ceramic or an alkali niobate ceramic.

In addition, although a unimorph piezoelectric vibrator is used in the first and second embodiments, the piezoelectric vibrator is not limited to this. A bimorph piezoelectric vibrator including a vibrating body 36 and piezoelectric elements 33 bonded to both surfaces of the vibrating body 36 may instead be used.

In addition, although the piezoelectric element 33 and the vibrating body 36 are substantially disc-shaped in the first and second embodiments, the shapes thereof are not limited to this. For example, the piezoelectric element 33 and the vibrating body 36 may instead have a substantially rectangular or polygonal shape.

In addition, although the frequency of the bending vibration of the vibrating plate included in the piezoelectric blower 13 is the frequency of the first mode in the first and second embodiments, the bending vibration is not limited to this. The bending vibration of the vibrating plate 32 may instead be such that the vibration mode number thereof is an odd number of 3 or more and that a plurality of vibration antinodes are formed.

In addition, although the blower chamber 45 has a cylindrical shape in the first and second embodiments, the shape of the blower chamber 45 is not limited to this. In practice, the blower chamber 45 may instead be, for example, substantially regular prism-shaped.

In addition, although the radius of the substantially convex rounded shape is set to a desired value by adjusting the drying time of the resin in the second embodiment, the method for setting the radius of the substantially convex rounded shape is not limited to this. The radius of the substantially convex rounded shape may instead be set to a desired value by adjusting, for example, the amount of resin that is sprayed, the time for which the resin is applied, or the number of times the resin is applied.

In addition, although the material of the coating materials 75 and 77 is a resin in the second embodiment, any material may be used as long as the hardness and the modulus of elasticity of the material are less than those of the second plate 23 and the first plate 21. The material may be, for example, a resin, such as polypropylene, polyethylene, or polytetrafluoroethylene, or a vulcanized rubber, such as isoprene rubber or silicone rubber.

Alternatively, the coating materials 75 and 77 may instead be a lubricant having self-lubricating properties, such as fluorine or molybdenum disulfide. When coatings having good self-lubricating properties are used, the friction due to contact with the movable plate 24 can be reduced, and the damage due to abrasion can be reduced accordingly.

While preferred embodiments of the present disclosure have been sufficiently described above with reference to the accompany drawings, variations and modifications will be apparent to those skilled in the art. It is to be understood that such variations and modifications are included in the scope of the present disclosure as long as they do not depart from the scope of the present disclosure, which is determined solely by the following claims. In addition, combinations and changes in the order of the components of the embodiments may be realized without departing from the scope and spirit of the present disclosure.

The present disclosure may be usefully applied to valves and fluid control devices including the valves.

What is claimed is:

1. A valve comprising:
a first plate having a first vent hole;
a second plate defining a valve chamber between the second plate and the first plate, the valve chamber communicating with the first vent hole, and the second plate having a second vent hole communicating with the valve chamber and not facing the first vent hole; and
a movable plate having a third vent hole facing the second vent hole, the movable plate being disposed in the valve chamber such that the movable plate is movable between the first plate and the second plate,
wherein the second plate has an auxiliary hole not facing the third vent hole of the movable plate, the auxiliary hole being surrounded by a first edge portion being a first corner portion having a substantially convex rounded shape in a front view of a principal surface of the second plate at a side facing the valve chamber, and
wherein the substantially convex rounded shape has a radius of greater than or equal to about 0.005 mm and less than or equal to about 0.25 mm.

2. The valve according to claim 1, wherein the first vent hole is surrounded by a second edge portion being a second corner portion having a substantially convex rounded shape in a front view of a principal surface of the first plate at a side facing the valve chamber.

3. The valve according to claim 2, wherein the second vent hole is surrounded by a third edge portion being a third corner portion having a substantially convex rounded shape in the front view of the principal surface of the second plate at the side facing the valve chamber.

4. A fluid control device comprising:
a blower including
an actuator including a vibrating body and a driving body, the driving body generating bending vibration of the vibrating body, and the vibrating body having a first principal surface and a second principal surface, and
a housing defining a blower chamber together with the actuator such that the vibrating body is disposed between the housing and the actuator in a thickness direction of the vibrating body; and
a valve according to claim 2,
wherein the housing has a discharge hole and a suction hole, the blower chamber communicating with an outside of the housing through the discharge hole, and the blower chamber communicating with the outside of the housing through the suction hole, and
wherein the second vent hole of the valve is connected to the suction hole of the blower.

5. The valve according to claim 1, wherein the second vent hole is surrounded by a third edge portion being a third corner portion having a substantially convex rounded shape in the front view of the principal surface of the second plate at the side facing the valve chamber.

6. A fluid control device comprising:
a blower including
an actuator including a vibrating body and a driving body, the driving body generating bending vibration of the vibrating body, and the vibrating body having a first principal surface and a second principal surface, and
a housing defining a blower chamber together with the actuator such that the vibrating body is disposed between the housing and the actuator in a thickness direction of the vibrating body; and
a valve according to claim 5,
wherein the housing has a discharge hole and a suction hole, the blower chamber communicating with an outside of the housing through the discharge hole, and the blower chamber communicating with the outside of the housing through the suction hole, and
wherein the second vent hole of the valve is connected to the suction hole of the blower.

7. A fluid control device comprising:
a blower including
an actuator including a vibrating body and a driving body, the driving body generating bending vibration of the vibrating body, and the vibrating body having a first principal surface and a second principal surface, and
a housing defining a blower chamber together with the actuator such that the vibrating body is disposed between the housing and the actuator in a thickness direction of the vibrating body; and
a valve according to claim 1,
wherein the housing has a discharge hole and a suction hole, the blower chamber communicating with an outside of the housing through the discharge hole, and the blower chamber communicating with the outside of the housing through the suction hole, and
wherein the second vent hole of the valve is connected to the suction hole of the blower.

8. The fluid control device according to claim 7, said first plate being interposed between said second plate and said vibrating body in cross-section.

9. A valve comprising:
a first plate having a first vent hole;
a second plate defining a valve chamber between the second plate and the first plate, the valve chamber communicating with the first vent hole, and the second plate having a second vent hole communicating with the valve chamber and not facing the first vent hole; and
a movable plate having a third vent hole facing the second vent hole, the movable plate being disposed in the valve chamber such that the movable plate is movable between the first plate and the second plate,
wherein the second plate has an auxiliary hole not facing the third vent hole of the movable plate,
wherein the second plate includes
a first principal surface facing the valve chamber,
a second principal surface at a side opposite to the first principal surface, and
an inner side surface connecting the first principal surface and the second principal surface so as to provide the auxiliary hole, said inner side surface having a substantially convex rounded shape in a front view of the first principal surface of the second plate at a side facing the valve chamber, wherein an angle between the inner side surface and the first principal surface is an obtuse angle, and wherein the substantially convex rounded shape has a radius of greater than or equal to about 0.005 mm and less than or equal to about 0.25 mm.

10. A fluid control device comprising:

a blower including an actuator including a vibrating body and a driving body, the driving body generating bending vibration of the vibrating body, and the vibrating body having a first principal surface and a second principal surface, and a housing defining a blower chamber together with the actuator such that the vibrating body is disposed between the housing and the actuator in a thickness direction of the vibrating body; and a valve according to claim 9, wherein the housing has a discharge hole and a suction hole, the blower chamber communicating with an outside of the housing through the discharge hole, and the blower chamber communicating with the outside of the housing through the suction hole, and wherein the second vent hole of the valve is connected to the suction hole of the blower.

\* \* \* \* \*